(12) United States Patent
Hasegawa et al.

(10) Patent No.: US 9,733,859 B2
(45) Date of Patent: Aug. 15, 2017

(54) METHOD FOR WRITING FILE WHILE SPANNING FILE OVER A PLURALITY OF TAPE CARTRIDGES

(71) Applicant: International Business Machines Corporation, Armonk, NY (US)

(72) Inventors: Tohru Hasegawa, Tokyo (JP); Masayuki Iwanaga, Urayasu-si (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/935,595

(22) Filed: Nov. 9, 2015

(65) Prior Publication Data

US 2016/0170681 A1  Jun. 16, 2016

(30) Foreign Application Priority Data

Dec. 11, 2014  (JP) ................. 2014-251310

(51) Int. Cl.
*G06F 12/00* (2006.01)
*G06F 3/06* (2006.01)

(52) U.S. Cl.
CPC .......... *G06F 3/0643* (2013.01); *G06F 3/0604* (2013.01); *G06F 3/0613* (2013.01); *G06F 3/0682* (2013.01); *G06F 3/0686* (2013.01)

(58) Field of Classification Search
CPC .... G06F 3/0643; G06F 3/0604; G06F 3/0613; G06F 3/0682; G06F 3/0686
See application file for complete search history.

(56) References Cited

U.S. PATENT DOCUMENTS

2015/0062733 A1* 3/2015 Ashida .................. G06F 3/0613
360/39

FOREIGN PATENT DOCUMENTS

JP  2014115807 A  6/2014
JP  2015036851 A  2/2015

OTHER PUBLICATIONS

"Method for Writing File While Spanning File Over a Plurality of Tape Cartridges", Japan Application No. 2014-251310, filed Dec. 11, 2014, pp. 1-26.

* cited by examiner

*Primary Examiner* — Shawn X Gu
(74) *Attorney, Agent, or Firm* — Edward J. Wixted, III

(57) ABSTRACT

A method, computer program product, and system for dividing a file and writing the file to a plurality of tapes in a tape library system comprising a plurality of tape apparatuses. A request to write a file to a plurality of tapes is received. The file comprises data. A number of available tapes is predicted with respect to a number of drives available at a time when the file requested to be written is written to the plurality of tapes. The data of the file is divided into a predetermined number of segments to reduce a time period for reading the file. The predetermined number of segments is based on the predicted number of tape drives. The data segments are written to the available tape drives.

17 Claims, 8 Drawing Sheets

CORRESPONDENCE BETWEEN TAPE MEDIA AND PIECES (SEGMENTS) OF FILE

```
┌─────────────────────────────────────────────────┐
│ TAPE 1: FILE 1/3                                │
└─────────────────────────────────────────────────┘

┌─────────────────────────────────────────────────┐
│ TAPE 2: FILE 1/3                                │
└─────────────────────────────────────────────────┘

┌──────────────────────────┐
│ TAPE 3: FILE 1/6         │
└──────────────────────────┘

┌──────────────────────────┐
│ TIAPE 4: FILE 1/6        │
└──────────────────────────┘
```

CORRESPONDENCE BETWEEN TAPE MEDIA AND PIECES
(SEGMENTS) OF FILE

FIG. 6

CORRESPONDENCE BETWEEN TAPE DRIVES AND TAPE MEDIA READ BY TAPE DRIVES WHEN THERE ARE THREE AVAILABLE TAPE DRIVES (A), AND WHEN THERE ARE TWO AVAILABLE TAPE DRIVES (B)

METHOD FOR WRITING FILE WHILE SPANNING FILE OVER A PLURALITY OF TAPE CARTRIDGES

BACKGROUND OF THE INVENTION

The present invention relates to a method for writing a file while spanning the file in a plurality of tapes (tape cartridges) in a file system for a tape library.

As a method in which a tape medium is utilized as a file system, for example as if the tape medium were a USB memory, there is an Linear Tape File System (LTFS). International Business Machines Corporation and other storage companies define a format and release implementations of the LTFS. In the LTFS, a tape medium is divided into two regions: an index partition (IP) and a data partition (DP). Mainly, meta information (index) such as a file name is recorded in the index partition, while, mainly, a body of the file is recorded in the data partition.

SUMMARY

According to one embodiment of the present invention, a method for dividing a file and writing the file to a plurality of tapes in a tape library system comprising a plurality of tape apparatuses is provided. The method includes receiving a request for writing a file to a plurality of tapes, wherein the file comprises data; predicting a number of available tapes with respect to a number of tape drives available at a time when the file requested to be written is written to the plurality of tapes; dividing the data of the file into a predetermined number of segments, based on the predicted number of available tape drives, to reduce a time period required for reading the file; and writing the data segments to the available tape drives.

According to another embodiment of the present invention, a computer program product for dividing a file and writing the file to a plurality of tapes in a tape library system comprising a plurality of tape apparatuses is provided. The computer program product comprises a computer readable storage medium and program instructions stored on the computer readable storage medium having instructions embodied therewith, wherein the computer readable storage medium is not a transitory signal per se, the program instructions readable by a file system to cause the file system to perform a method. The method includes receiving a request for writing a file to a plurality of tapes, wherein the file comprises data; predicting a number of available tapes with respect to a number of tape drives available at a time when the file requested to be written is written to the plurality of tapes; dividing the data of the file into a predetermined number of segments, based on the predicted number of available tape drives, to reduce a time period required for reading the file; and writing the data segments to the available tape drives.

According to another embodiment of the present invention, a system for dividing a file and writing the file to a plurality of tapes in a tape library system comprising a plurality of tape apparatuses is provided. The system includes a server and a computer readable storage medium having instructions embodied therewith, wherein the computer readable storage medium is not a transitory signal per se, the program instructions readable by a file system to cause the file system to perform a method. The method includes receiving a request for writing a file to a plurality of tapes, wherein the file comprises data; predicting a number of available tapes with respect to a number of tape drives available at a time when the file requested to be written is written to the plurality of tapes; dividing the data of the file into a predetermined number of segments, based on the predicted number of available tape drives, to reduce a time period required for reading the file; and writing the data segments to the available tape drives.

BRIEF DESCRIPTION OF THE DRAWINGS

FIG. 6 is a diagram illustrating an aspect where segments of a file are stored in a plurality of tape media, in accordance with an embodiment of the present invention;

DETAILED DESCRIPTION

Embodiments of the present invention address a problem that it takes more time than expected to read a spanning file with conventional techniques. Therefore, an object of the present invention is to provide a method for writing a spanning file, a tape library system and a program, which are capable of minimizing a time period required to read a spanning file when read conditions are different.

Embodiments of the present invention provide a technique for determining a division ratio of a file to reduce a time period required for reading a spanning file. For example, where read conditions are different and where a single file is redundantly recorded in a multivolume tape. Embodiments of the present invention make the number of tape media, which include segments of each file, different between prior to and after duplication when a specific file is stored in a plurality of tape media in an overlapped manner. In a tape library system, degradation of a time period required for reading a file, caused when the number of available tape drives fluctuates, is reduced.

Figure 1:
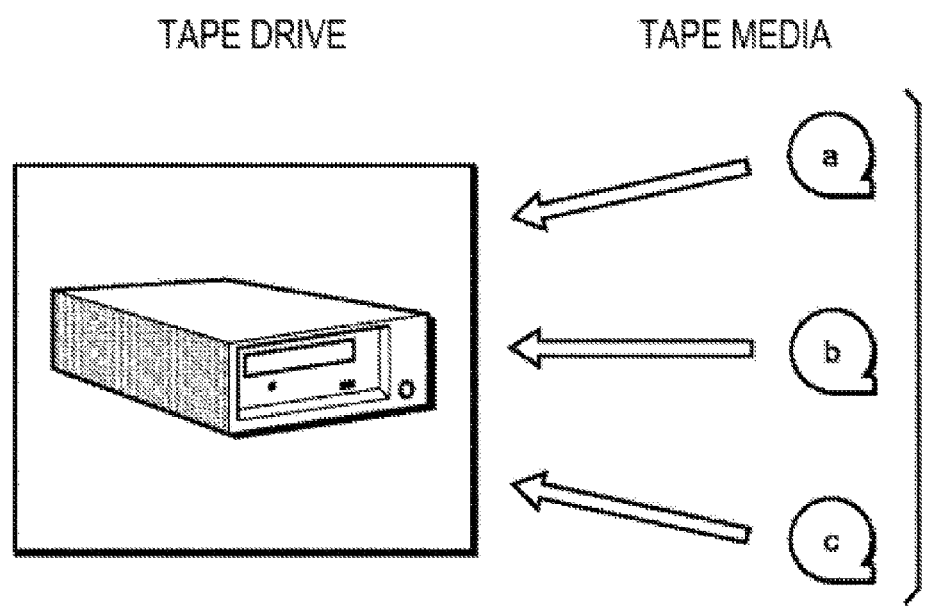
FIG. 1 illustrates a typical aspect where one file is stored while spanned over a plurality of tape media (media, tapes) according to a conventional LTFS.

For a better understanding of the present invention, a tape library system and a method for writing a spanning file, where a spanning file is written in an LTFS format, as an example will be described. FIG. 1 illustrates a typical aspect of a tape library where one file is stored while being spanned over a plurality of tape media using the conventional LTFS.

FIG. 1 illustrates an aspect of a tape library where a plurality of media are loaded/unloaded to/from one drive. Typically, a storage system includes one or two or more tape drives, and a variety of media use the drives. Blocks "a", "b", and "c" of FIG. 1 are IDs of media indicating indexes of the media. The storage system, such as a tape library, specifies a target medium with this ID. Typically, one drive can be used for spanning, but the other drives are being used for other purposes. A first medium "a" is loaded (e.g., mounted) to one drive, and a head of the file and a data portion (e.g., segment) are written. In this drive, meta data of the file is stored in the medium "a" as an index. Then, the medium "a" is unloaded (e.g., unmounted). A next medium "b" is loaded to the same drive, and a next file portion of the file is written. In this drive, metadata of the file is stored in the medium "b" as an index. Then, the medium "b" is unloaded. A next medium "c" is loaded to the same drive, and a next file portion of the file is written. In this drive, meta data of the file is stored in the medium "c" as an index. Here, spanning of one file is completed. In the conventional LTFS, because it cannot be assumed that there is a case where a file is written in a plurality of media in an early stage of writing of the file, each file portion is independently stored in each medium.

Tape drives in the system cannot always be utilized when a file is read from the tape media. For example, when an LTFS Enterprise Edition is utilized, there is a case where one tape drive cannot be utilized due to export/import of the tape media, or a case where two tape drives cannot be utilized due to reclaim. Here, export/import takes a tape medium out of the system allowing the tape medium to be placed on a rack or inserting a tape medium on the rack into the system. The reclaim moves necessary data, written on a tape medium, to another tape medium so the first tape medium can be formatted. The required time period is affected (e.g., increased) when a file (e.g., spanning file) is divided, written to, and read by a plurality of tape media. Specifically, when the tape library cannot utilize tape drives of a divisor of the number of tapes, including the file, a time period required for reading the spanning file increases.

Figure 2:
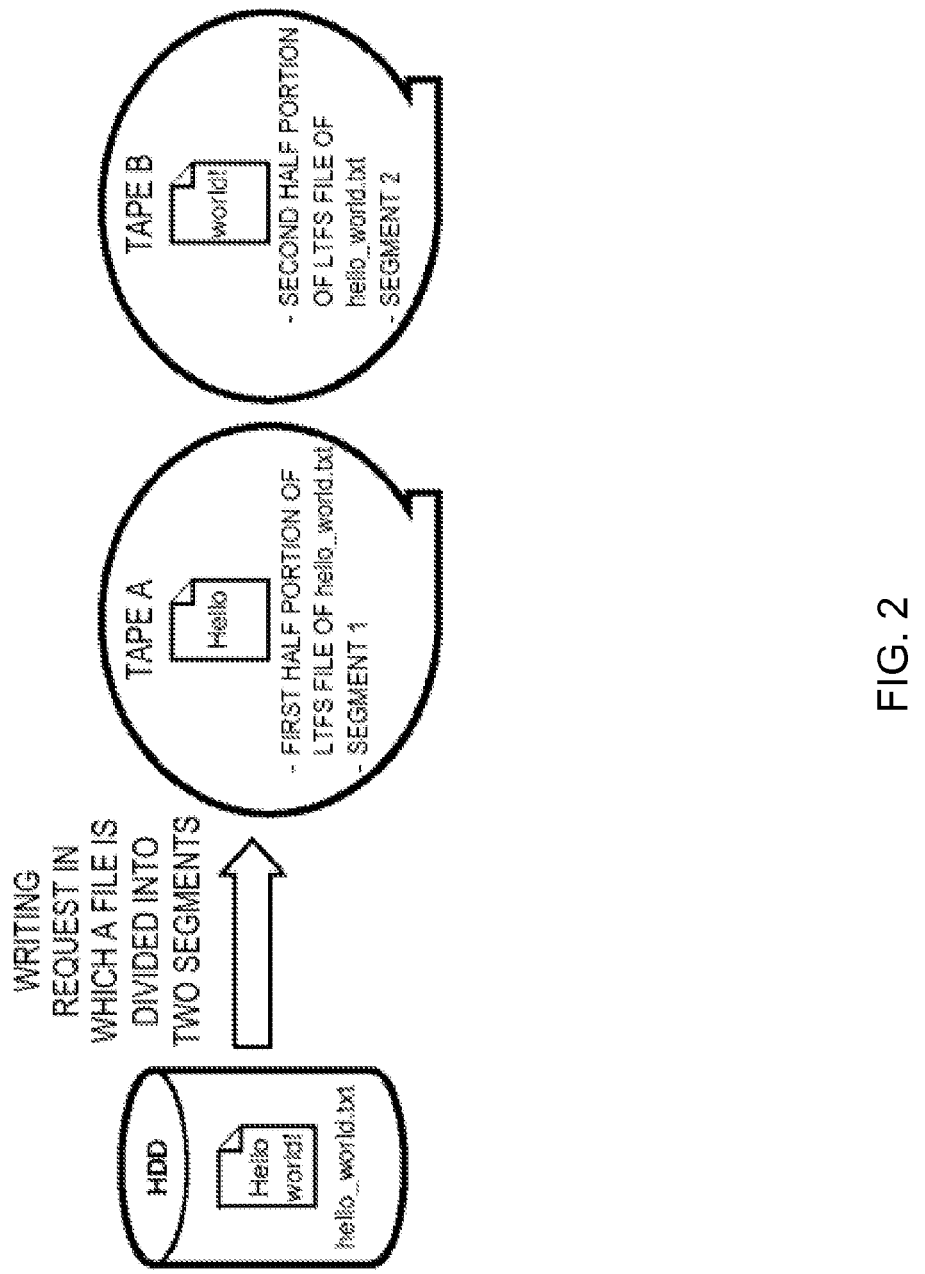
FIG. 2 is a schematic diagram illustrating an LTFS dividing one file into a plurality of segments and writing the file in a plurality of tapes as a spanning file, in accordance with an embodiment of the present invention.

FIG. 2 is a schematic diagram illustrating the LTFS dividing one file into a plurality of (e.g., two) segments and writing the file in a plurality of (e.g., two) tapes as a spanning file.

In an embodiment of the present invention, a format is designed such that one file is stored on tape media while being divided into a plurality of file portions (e.g., segments). With support of the spanning file of the LTFS, one file "hello_world.txt" can be divided into two segments and stored in two tape media. A first half of the LTFS file of "hello_world.txt" is stored in tape A as segment 1. A second half of the LTFS file of "hello_world.txt" is stored in tape B as segment 2.

Figure 3:
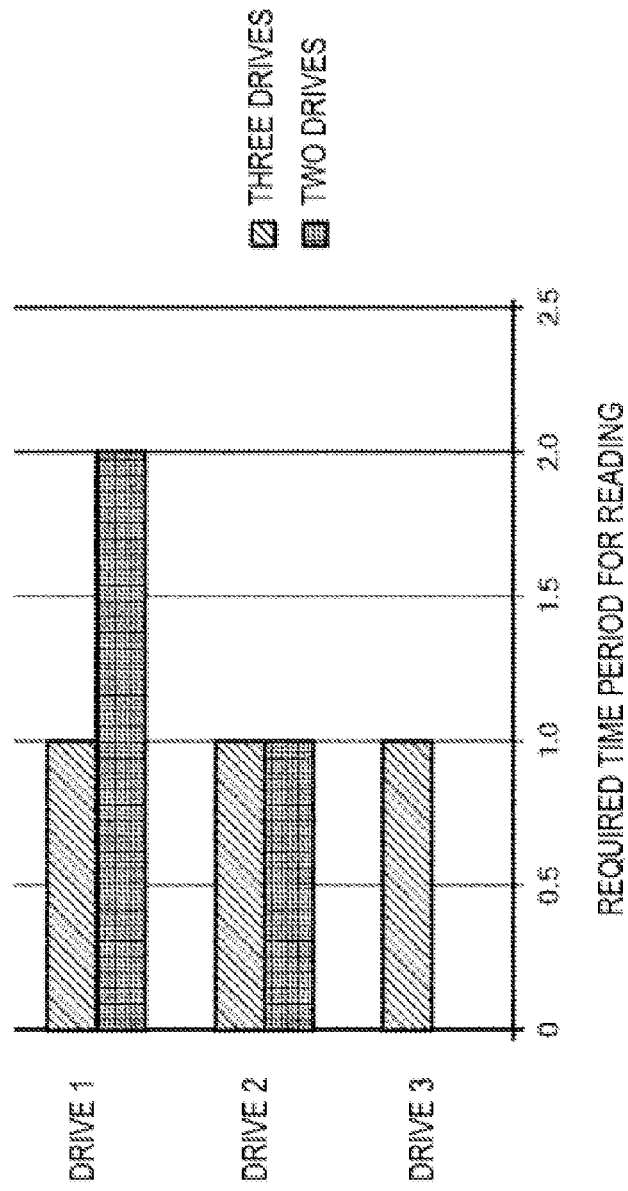
FIG. 3 is a chart illustrating a time period required for reading a file which is equally divided into and written on three tape media, in accordance with an embodiment of the present invention.

FIG. 3 is a chart illustrating a time period required for reading a file which is equally divided into and written on three tape media, in accordance with an embodiment of the present invention.

For example, a case will be assumed where, in a system having three tape drives, a file is divided and written in three tape cartridges. When a time period required for reading the file in parallel using three tape drives is 1, a time period required for reading the file using two tape drives is not 1.5, but 2 (as shown in FIG. 3). Here, the time period required for reading the file is a time period from starting of read of the file until end of read of the file. When only two tape drives can be utilized, the tape library system executes the following processing. Two tape drives respectively read segments of two tape media. Subsequently, it is necessary to read a segment from the third tape medium using any of the tape drives.

Figure 4:
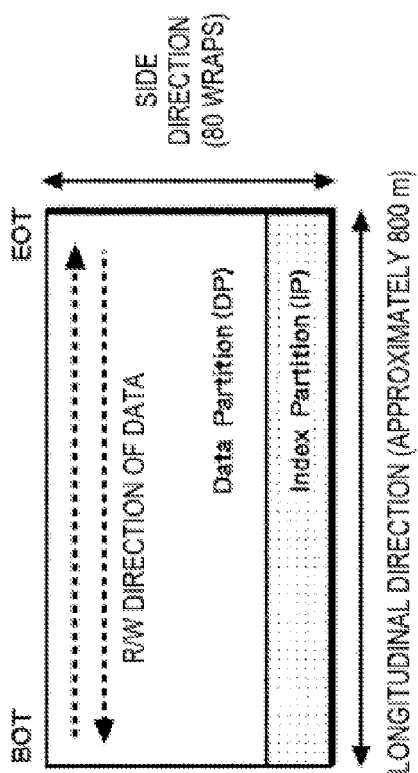
FIG. 4 is a chart illustrating a tape divided into two partitions by the LTFS, in accordance with an embodiment of the present invention.

FIG. 4 is a chart illustrating a tape divided into two partitions by the LTFS, in accordance with an embodiment of the present invention.

An LTO5 tape drive writes data while moving back and forth on wraps in a write region along a longitudinal direction of a tape. In the LTFS, two wraps (e.g., corresponding to one round trip) is utilized as an index partition. The tape is partitioned into an index partition (IP) and a data partition (DP) over a region from beginning of tape (BOT) to an end of tape (EOT). A unit (e.g., a head) performs reading and writing at the same time on a track, and 16 tracks correspond to 1 wrap. In an LTO5 tape cartridge, a tape longitudinal direction is approximately 800 m, and a side direction has a width corresponding to 80 wraps. The IP and the DP are partitioned by a guard band of two wraps. The tape moves back and forth in a longitudinal direction of the wrap. Reversing of the moving direction at the BOT and the EOT is referred to as wrap turn. It requires 60 to 90 seconds to move from the BOT to the EOT in the longitudinal direction of the tape with respect to the head of the tape drive. It requires approximately 30 to 45 seconds for the tape to move by half of the longitudinal direction.

In a file system for a tape drive, for example, the LTFS, data written on a medium can be presented as a file. When a user writes a file in a tape medium by utilizing the LTFS, in addition to a body of the file, meta information referred to as an index file (i.e., index) is written on the tape medium. The index includes a directory name, a file name, and a file created date. The meta information and location meta information include a location on the medium, a size of the information, offset within the file, or the like, in an XML format. Further, when one file is divided into a plurality of segments, the index includes meta information related to the segments. The latest index is mainly written in the IP. A body of the file sequentially added and changed, and history of the index in association with the addition and the change, are appended in the DP of the medium.

When a file on the tape medium is read or written using the LTFS, data is read or written in a unit referred to as a record. The record which is referred to as a block in the LTFS, provides an LTFS format. The block is managed with a number indicating a number of blocks from the head of the partition, for each partition in which data of the file is recorded. The index file includes location information designated with the number of the block with respect to the data of the file.

Figure 5:
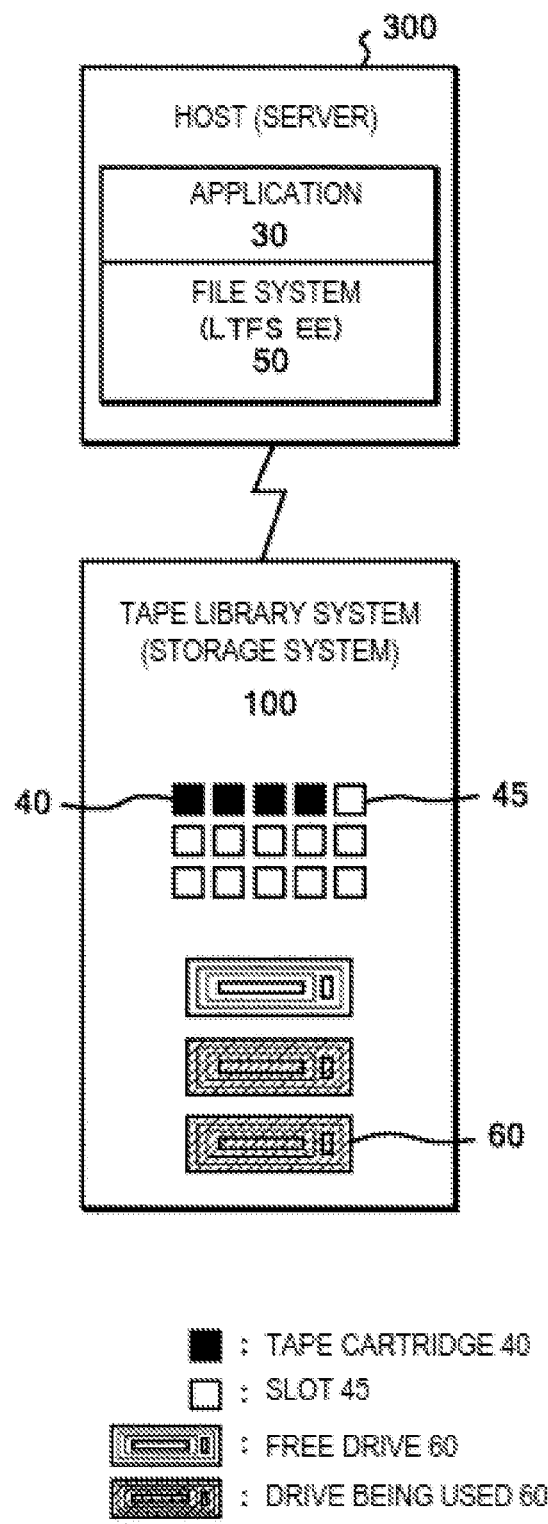
FIG. 5 is a block diagram illustrating a configuration example of a tape library system including a plurality of tape drives, in accordance with an embodiment of the present invention.

FIG. 5 illustrates a configuration example of a tape library system including a plurality of tape drives, to which the present invention is applied.

A storage system 100 includes three tape drives 60, tape cartridges 40, and slots 45 which store the tape cartridges. There are a number of tape cartridges 40 stored in the slots 45 within the storage system.

A file system 50, for example, an LTFSEE which is located between a host 300 and the storage system 100, manages a plurality of drives 60 and a plurality of tape cartridges 40 in a centralized manner. The file system virtualizes the plurality of cartridges 40 and the drives 60 and performs read/write control. Application 30 of the host 300 requests reading/writing of the file to the storage system 100 via the file system 50. The storage system 100 is controlled by various commands (such as reading/writing and positioning) issued by the application 30. The file system 50 temporarily stores commands from the application and outputs an SCSI command corresponding to the commands, or the like, to the storage system 100.

The file system 50 receives a command for requesting loading from the application 30. Typically, when this command is executed, the file system 50 searches a free drive from a plurality of (e.g., three) drives. The file system 50 loads a tape cartridge for which loading is requested to a free drive. When a plurality (e.g., three) drives are being used, the file system 50 stands by until a free drive appears. Further, the tape library system can also be utilized on the file system 50 in a similar manner to an HDD, or the like. For example, in the LTFS, data written on the medium can be presented as a file.

The tape drive 60 writes/reads a plurality of pieces of data transmitted from the host 300 to a tape recording medium in a unit of a dataset (referred to as a DS) of a fixed length. In some embodiments, a typical size of the DS is 4 MB. The application 30 of the host 300 transmits a write/read request to the tape drive via the file system 50 in a unit of a block of 128 KB. When SCSI is used as communication standard, the application 30 issues a request (e.g., read or write) for writing/reading data to the tape drive 60. It should be noted that the tape drive 60 reads/writes data in a unit of a DS constructed with a plurality of blocks.

The tape drive 60 writes data to a tape or reads data from the tape according to a command received from the host 300. The tape drive 60 includes a buffer, a read/write channel, a head, a motor, a reel around which the tape (e.g., tape cartridge) is wound, a read/write control, a head position control system, and a motor driver. The tape cartridge is detachably mounted on the tape drive. The tape moves in a longitudinal direction in accordance with rotation of the reel. The head writes data to a tape or reads data from the tape while the tape moves in the longitudinal direction. Further, the tape cartridge 40 includes a non-contact non-volatile memory referred to as a cartridge memory (CM). The CM mounted on the tape cartridge 40 is read/written by the tape drive 60 in a non-contact manner. The CM stores a cartridge attribute. The tape drive takes out the cartridge attribute from the CM upon reading and writing, such that optimal reading/writing can be performed.

FIG. 6 illustrates an aspect where pieces (e.g., segments) of a file are stored in a plurality of (e.g., four) tape media.

In one example, when a specific file is stored in a plurality of tape media in a duplicated manner, it is assumed that the number of unavailable tape drives is at most N. Assuming that the number of tape drives in the tape library system is A, segments of a volume of 1/A of a file size are respectively stored in A−N tape media. Data of a volume of N/A of the remaining file size is equally divided into and written on A−N tape media which are different from the tape media in which the segments of the volume of 1/A are stored. This example will be specifically studied assuming that A=3 and N=1. As illustrated in FIG. 6, one third of the file is respectively written on tape 1 and tape 2, one sixth of the file is respectively written on tape 3 and tape 4. This one sixth indicates an amount of data obtained by equally dividing the remaining one third of the file volume and storing the file in two tapes (tape 3, tape 4).

Figure 7:
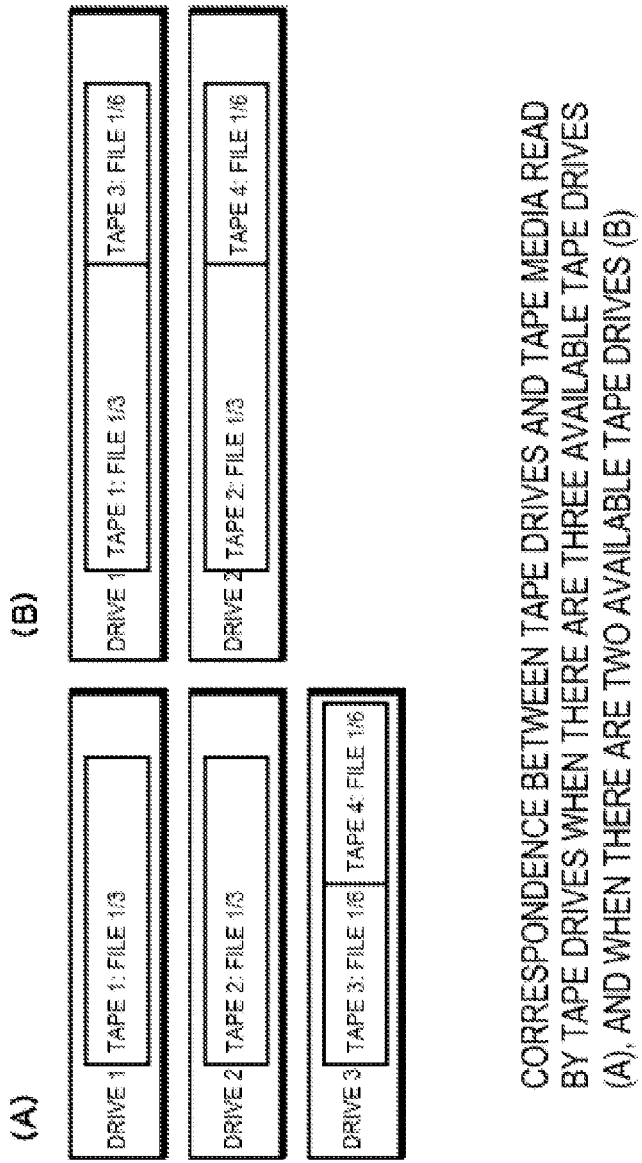
FIG. 7 is a diagram illustrating a correspondence relationship between tape drives and tape media to be read when the number of available tape drives is three, and, when the number of available tape drives is two, in accordance with an embodiment of the present invention.

FIG. 7 illustrates correspondence relationship between the tape drives and the tape media to be read by the tape drives when the number of available tape drives is three, and when the number of available tape drives is two.

Upon read, when three tape drives are available (A) and when only two tape drives are available (B), the tape media are assigned to the tape drives and read is performed as illustrated in FIG. 7.

Figure 8:
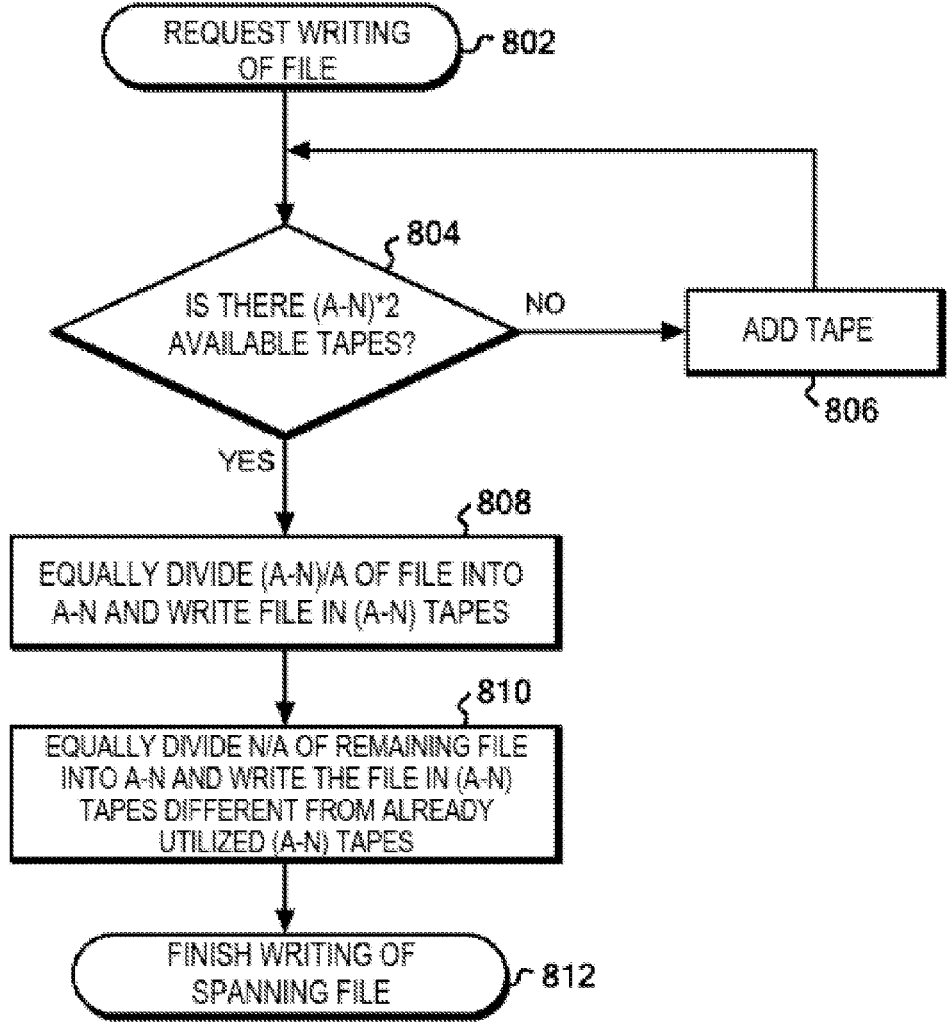
FIG. 8 is a flowchart illustrating processing of writing a file while spanning the file, in accordance with an embodiment of the present invention.

FIG. 8 illustrates a flowchart explaining processing of writing a file while spanning the file as an example of the present invention.

In this example, a flowchart for dividing and writing (e.g., spanning) a file in a plurality of tapes is as illustrated in FIG. 8. One file is divided into a plurality of portions, that is, segments, and stored in different tape media (e.g., tapes, tape cartridges, etc.). The file stored in the plurality of tapes is referred to as a spanning file. The flowchart illustrates an example of spanning processing when the file system receives a request for writing the file. Further, similar processing may also be performed by the application.

In step 802, the file system (e.g., the LTFS Enterprise Edition) receives a request for writing a file from the application of the host.

In determination 804, the LTFS confirms whether the tape library 100 holds available (A−N)*2 tape media 40.

In step 806, when a predetermined number of free tape cartridges do not exist in the tape library 100 (decision 804, No branch), the file system stands by until a tape cartridge having free space is prepared and adds the tape cartridge having free space to the tape library.

In step 808, when the predetermined number of free tape cartridges exist in the tape library (decision 804, Yes branch), (A−N)/A among a total amount of data of the file is equally divided into A−N and respectively written in (A−N) tape cartridges.

In step 810, N/A of the remaining amount of the total amount of data of the file is equally divided into A−N and written in another (A−N) tape cartridges.

In step 812, a writing method in which one file is stored while being spanned over a plurality of tape cartridges is finished.

The example includes a case where one file is written while being spanned over tape cartridges 40 of a number (e.g., four or more) larger than the number (e.g., three) of the tape drives 60 existing in the tape library 100 (FIG. 5).

As another example, the file may be stored in a dispersed manner so that the number of tape media, including segments of each file, simply becomes a least common multiple of the number of tape drives expected to be available. For example, in a system having three tape drives, the number of tape drives expected to be available is any of one, two, and three. Upon duplication of the file, the file is divided and stored into six tape media which are a least common multiple of one, two, and three. When three tape drives are available, two segments are read from each drive, in the case of two available tape drives, three segments are read from each drive, and, in the case of one available tape drive, six segments are read from the tape drive. When a case of (B) in FIG. 7 is compared with the example of FIG. 3, it is possible to reduce influence on the time period required for read due to unavailability of one tape drive by half. In this manner, in the present example, when the number of available tape drives fluctuates by a file being spanned over a number of tapes, it is possible to reduce a time period required for reading the file. Meanwhile, when the tape drive utilizes a plurality of tape media to read a file, a predetermined overhead occurs to exchange media. For example, it takes approximately one minute including a rewind time period of the tape medium to exchange the tape media. It takes 80 minutes or longer to read data of 1 TB at 200 MB/sec. Taking into account that a time period required for exchanging the tape media is compared with the read period, the time period required for exchanging the tape media is sufficiently allowable to deal with a file having a large volume which is written on a plurality of tape media in a dispersed manner.

As still another example, it is also possible to perform spanning of a file over the media for suppressing occurrence of an overhead due to exchange of the tape media when the file is read, when the file is written in a dispersed manner in tape media of a least common multiple of the number which is obtained by subtracting the number of tape media prior to duplication from the number of tape drives expected to be available. For example, when there are three tape drives, and the file is written on three tape media before duplication, the file is written on the tape media of the number which is obtained by subtracting the number of tape media of three from the number of tape drives of one, two, and three expected to be available, that is, 2 which is a least common multiple of 1 and 2. When there expected to be two tape drives, 2 tape media (tape 1, tape 2) which is the least common multiple are prepared. Specifically, description will be provided with reference to a case where two tape media are exchanged in the case of (B) in FIG. 7. In FIG. 7(B), pieces of data of tape 1 and tape 3 mounted on the drive 1 (⅓ and ⅙ of the file) are stored in one tape 1 in this example. Further, in FIG. 7(B), pieces of data of tape 2 and tape 4 mounted on the drive 2 (⅓ and ⅙ of the file) is stored in one tape 2 in this example. According to this example of spanning, it is possible to realize reduction of a time period required for reading a spanning file, which is suppressed by a tape media effect.

As described above, in a tape library system which implements the writing method of the present invention, it is possible to suppress degradation of a time period required for reading a spanning file even when the number of available tape drives fluctuates. It should be noted that while the present invention has been described using an embodiment (examples), the scope of the present invention is not limited to the above-described examples. It is obvious for a person skilled in the art that the present invention can be changed in various manners or alternative aspects can be employed without departing from the spirit and the scope of the present invention.

To achieve this object, the present invention provides a method for dividing a file and writing (spanning) the file in a plurality of tapes (tape cartridges) in a tape library system including a plurality of tape apparatuses. This writing method includes the steps of (a) receiving a request for writing a file from a host, (b) predicting the number of available tape apparatuses with respect to the number of tape drives available at the time when the file requested to be written is written on the plurality of tapes, (c) dividing data of the file requested to be written into a predetermined number of segments based on the predicted number of available tape drives so as to reduce a time period required for reading the file, and (d) writing the segments corresponding to the predetermined number of tapes in the corresponding tapes.

Further, in this writing method, the predetermined number in the divided data is determined so that the data is divided into the segments (portions of the file) and stored in tapes of a number larger than the predicted number of available tape drives.

Further, in this writing method, the predetermined number in the dividing data step is determined so that the data is divided into the segments (portion of the file) and stored into tapes of the number larger than the total number of tape drives.

Further, in this writing method, the predetermined number in the (c) is determined so that assuming that the number of unavailable tape apparatuses is N and the number of tape drives in the tape library system is A, segments of a volume of one A-th of the file size are stored in A-N tape media (step 808, FIG. 8), and data of a volume of N A-ths of the remaining file is equally divided into and written on A-N tapes different from the tapes where the segments of the volume of one A-th are stored (step 810).

Further, this writing method includes the steps of confirming whether (A-N)*2 available tapes are held in the tape library system (step 804, FIG. 8), and, when a predetermined number (A-N)*2 of free tape cartridges do not exist in the tape library system (step 804: No), standing by until a tape cartridge having free space is prepared and adding the tape cartridge having free space (step 806).

Further, this writing method includes the steps of, when the predetermined number (A-N)*2 of free tapes exist in the tape library system (step 804: Yes), equally dividing (A-N)/A among a total amount of data of the file into A-N to be written in respective (A-N) tape cartridges (step 808), equally dividing N/A of the remaining among the total amount of data of the file into A-N to be written in another (A-N) tape cartridges (step 810), and finishing a writing method in which one file is stored while being spanned over a plurality of tape cartridges (step 812).

Further, in this writing method, the predetermined number is determined so that data is dispersed and stored such that the number of tape media including segments of each file becomes simply a least common multiple of the number of tape drives which are expected to be available.

Further, in this writing method, the predetermined number is determined so that when the spanning file is duplicated, data is dispersed and stored in tape media of the number of a least common multiple of a number obtained by subtracting the number of tape media prior to duplication from the number of tape drives expected to be available.

Further, to achieve this object, the present invention provides a tape library system including a plurality of tape apparatuses, the tape library system executing each step of any of the above-described writing methods.

Still further, to achieve this object, the present invention provides a computer program causing a tape library system including a plurality of tape apparatuses to execute each step of any of the above-described writing methods.

According to the above-described writing method of the present invention, it is possible to suppress degradation of a time period required for reading a file, the degradation being caused when the number of available tape drives fluctuates in a tape library system.

What is claimed is:
1. A method for dividing a file and writing the file to a plurality of tapes in a tape library system comprising a plurality of tape apparatuses, the method comprising:
    receiving a request for writing the file to the plurality of tapes, wherein the file comprises data;
    predicting a number of available tapes with respect to a number of tape drives available at a time when the file requested to be written is written to the plurality of tapes;
    dividing the data of the file into a predetermined number of segments, based on the predicted number of available tape drives, to reduce a time period required for reading the file; and
    writing the data segments to the available tape drives.

2. The method according to claim 1, wherein the predetermined number of segments is determined by subtracting a number of unavailable tapes from a number of tapes in a tape library.

3. The method according to claim 2, wherein the predetermined number of segments is determined so that that the number of unavailable tapes is N and the number of tapes in the tape library is A, segments of a volume of 1/A of the data are stored in a first A-N tapes, and data of a volume of N/A of the remaining data is equally divided into and written to a second A-N tapes, wherein the first A-N tapes are different than the second A-N tapes.

4. The method according to claim 3, comprising:
confirming whether available (A–N)*2 tapes are held in the tape library system; and
in response to determining that (A–N)*2 tapes do not exist in the tape library, preparing a tape having free space and adding the tape having the free space to the tape library.

5. The method according to claim 4, comprising:
in response to determining that (A–N)*2 tapes exist in the tape library, equally dividing (A–N)/A of the data among the first A-N tapes and respectively writing the data to the first A-N tapes; and
equally dividing remaining N/A data of the file into A-N segments and writing the A-N segments to the second A-N tape cartridges.

6. The method according to claim 1, wherein the predetermined number of segments is determined by identifying a total number of tapes in a tape library.

7. A computer program product for dividing a file and writing the file to a plurality of tapes in a tape library system, the computer program product comprising a computer readable storage medium having instructions embodied therewith, wherein the computer readable storage medium is not a transitory signal per se, the program instructions readable by a file system to cause the file system to perform a method comprising:
receiving a request for writing the file to the plurality of tapes, wherein the file comprises data;
predicting a number of available tapes with respect to a number of tape drives available at a time when the file requested to be written is written to the plurality of tapes;
dividing the data of the file into a predetermined number of segments, based on the predicted number of available tape drives, to reduce a time period required for reading the file; and
writing the data segments to the available tape drives.

8. The computer program product according to claim 7, wherein the predetermined number of segments is determined by subtracting a number of unavailable tapes from a number of tapes in a tape library.

9. The computer program product according to claim 8, wherein the predetermined number of segments is determined so that that the number of unavailable tapes is N and the number of tapes in the tape library is A, segments of a volume of 1/A of the data are stored in a first A-N tapes, and data of a volume of N/A of the remaining data is equally divided into and written to a second A-N tapes, wherein the first A-N tapes are different than the second A-N tapes.

10. The computer program product according to claim 9, further comprising:
confirming whether available (A–N)*2 tapes are held in the tape library system; and
in response to determining that (A–N)*2 tapes do not exist in the tape library, preparing a tape having free space and adding the tape having the free space to the tape library.

11. The computer program product according to claim 10, further comprising:
in response to determining that (A–N)*2 tapes exist in the tape library, equally dividing (A–N)/A of the data among the first A-N tapes and respectively writing the data to the first A-N tapes; and
equally dividing remaining N/A data of the file into A-N segments and writing the A-N segments to the second A-N tape cartridges.

12. The computer program product according to claim 7, wherein the predetermined number of segments is determined by identifying a total number of tapes in a tape library.

13. A system for dividing a file and writing the file to a plurality of tapes in a tape library system, the system comprising a server and a computer readable storage medium having instructions embodied therewith, wherein the computer readable storage medium is not a transitory signal per se, the program instructions readable by a file system to cause the file system to perform a method comprising:
receiving a request for writing the file to the plurality of tapes, wherein the file comprises data;
predicting a number of available tapes with respect to a number of tape drives available at a time when the file requested to be written is written to the plurality of tapes;
dividing the data of the file into a predetermined number of segments, based on the predicted number of available tape drives, to reduce a time period required for reading the file; and
writing the data segments to the available tape drives.

14. The system according to claim 13, wherein the predetermined number of segments is determined by subtracting a number of unavailable tapes from a number of tapes in a tape library.

15. The system according to claim 14, wherein the predetermined number of segments is determined so that that the number of unavailable tapes is N and the number of tapes in the tape library is A, segments of a volume of 1/A of the data are stored in a first A-N tapes, and data of a volume of N/A of the remaining data is equally divided into and written to a second A-N tapes, wherein the first A-N tapes are different than the second A-N tapes.

16. The system according to claim 15, further comprising:
confirming whether available (A–N)*2 tapes are held in the tape library system; and
in response to determining that (A–N)*2 tapes do not exist in the tape library, preparing a tape having free space and adding the tape having the free space to the tape library.

17. The system according to claim 16, further comprising:
in response to determining that (A–N)*2 tapes exist in the tape library, equally dividing (A–N)/A of the data among the first A-N tapes and respectively writing the data to the first A-N tapes; and
equally dividing remaining N/A data of the file into A-N segments and writing the A-N segments to the second A-N tape cartridges.

* * * * *